Patented Oct. 30, 1945

2,387,735

UNITED STATES PATENT OFFICE 2,387,735

METHOD OF FORMING CARBOXYLIC AMINO ACIDS

Frederick C. Bersworth, Verona, N. J., assignor to The Martin Dennis Company, Newark, N. J., a corporation of New Jersey No Drawing. Application July 3, 1941,
Serial No. 400,967

4 Claims. (Cl. 260—534)

This invention relates to organic chemistry and more particularly to carboxylic amino acids and has for its object the provision of an improved method of synthesizing such acids.

Another object is to provide a method of forming the alkali metal salts of the mono and poly carboxylic amino acids of ethylene diamine, and of other primary, secondary and tertiary amines and polyamines, particularly those of the aliphatic series of amines.

Other objects and advantages will be apparent as the invention is more fully hereinafter disclosed.

Heretofore in the art many different methods have been proposed for the synthesis of carboxylic amino acids. Each of these prior methods have been characterized by an exceedingly low yield of the amino acid.

In general the prior art methods produce as a final product an alkali metal salt of the carboxylic amino acid in an aqueous solution from which the amino acid is recovered by precipitation on acidification of the solution with strong mineral acid.

I have discovered that the exceedingly low recoveries of the amino acid from an aqueous solution of the alkali metal salts of said amino acids upon acidification of the solution with mineral acids is due to the fact that the amino acid, while of relatively low solubility in pure water, has a relatively high solubility in water containing any dissolved organic and inorganic compounds, reacting therewith to form complex reaction products which are in the main highly soluble and non-isolatable therefrom by the ordinary precipitation agents for either the amino acid or the organic and inorganic compound reacted therewith.

After considerable research and experimentation I have arrived at the conclusion that all carboxylic amino acids and the water soluble salts thereof, in aqueous solution and even in pure water, exist in two forms, molecular and ionic, and that the specific equilibrium between the two forms in any given solution depends upon the concentration of the acid or its water soluble salt in the solution and the temperature of the solution.

I have also discovered that the amino acid or salt when ionized undergoes an internal rearrangement forming an amphoteric complex which is highly reactive towards acidic and basic ions in solution therewith to form complex compounds therewith which have a high solubility in water and which subsequently are difficultly decomposable or isolatable from solution.

I have further discovered that in any given aqueous solution of a water soluble salt of the said amino acids, such as for example, in an aqueous solution of an alkali metal salt of the said acid, the pH of the solution markedly effects the degree or extent of ionization of the carboxylic group of said salt and that to substantially suppress ionization of the carboxylic group in such solutions the pH of the solution must approximate at least a pH of about 9.

The discoveries of the chemical characteristics of the said carboxylic amino acids hereinabove described offer unusual and exceptional possibilities of adaptation in the synthesis of these carboxylic amino acids and in the conversion of the synthesized acids to compounds of great utility in the art. The present invention is directed to a method of synthesizing the carboxylic amino acids and the formation of the alkali metal salts thereof in aqueous solution.

In co-pending application Serial No. 372,574 filed December 31, 1940, I have described a method of forming a condensation product by reacting an aldehyde, such as formaldehyde, with a metal cyanide, such as sodium cyanide, in an aqueous solution under controlled temperature conditions. The condensation product formed in this reaction is a nitrile having a composition indicated by the formula $NaOCH_2CN$. This nitrile is essentially unstable and undergoes hydrolysis in aqueous solution, the rate of hydrolysis increasing with increase in temperature above temperatures approximating 30° C. and with decrease in concentration, to a carboxylic acid salt with liberation of ammonia $(NH_3)$.

The exact mechanism by which this reaction occurs is not apparent and in solutions having a pH below about 9 the formation of the carboxylic salt is obscured by reason of the fact that the carboxylic acid salt and the ammonia liberated enter into recombination with the remaining nitrile compound to form a complex system of intermediate reaction products, the compositions of which are unresolvable by analysis methods known at the present.

However, I have found that at a pH above about 9 the conversion of the nitrile to the carboxylic acid salts may be effectively stabilized and rendered substantially complete, but due to the chemical activity of the carboxylic acid salt formed various condensation products thereof will be obtained, the precise system of condensation products depending mainly on the temperature of hydrolysis and the concentration of the solution.

As an example, when one mole of formaldehyde $(CH_2O)$ is added slowly to a mole solution of NaCN in about 250 c. c. water, and the temperature of the solution is maintained throughout the aldehyde addition at a temperature within the range 15 to 25° C., the aldehyde and cyanide will react substantially completely to form one mole weight of the nitrile compound $NaOCH_2CN$. At temperatures below about 30° C. this nitrile compound is fairly stable for prolonged time intervals in aqueous solution, the stability of the nitrile increasing with increase in pH up to a pH of about 8. Above a pH of about 8 hydrolysis proceeds slowly at temperatures below about 30° C., but increasing with increase in temperature and with increase in pH. At a pH of about 9 and at all temperatures above about 30° C. the rate of hydrolysis of the nitrile to the carboxylic acid salt is relatively rapid and at a temperature approximating 60° C., the rate of hydrolysis is so rapid that hydrolysis occurs in a matter of seconds rather than hours as at a very low pH.

I have found that in order to inhibit ionization and secondary hydrolysis of the hydrolysis product the pH of the solution must be maintained at a pH of at least 9 with alkali hydroxide, the alkali metal of which is identical to the alkali metal constituent of the nitrile.

By permitting the hydrolysis reaction to proceed at a temperature of about 40 to 45° C. at a pH below about 9, the resulting hydrolysis product is comprised of a system of compounds consisting of a mixture of glycine and organic compounds consisting of intermediate reaction and decomposition products of glycine, the amount of glycine present apparently decreasing directly with decrease in pH. At a pH of about 9 the formation of glycine appears to be in major part inhibited due, it is believed, to the fact that at a pH of about 9 and in the presence of a strong alkali such as NaOH, the solubility of the ammonia ($NH_3$) liberated in the hydrolysis of the nitrile in the solution is exceedingly low and the bulk of the ammonia ($NH_3$) is thrown out of the solution as gaseous or molecular ammonia. By providing means to rapidly expel the ammonia from the solution, as by vigorous agitation, higher hydrolysis temperatures or reduced pressures, the formation of intermediate reaction products by reaction with the $NH_3$ liberated during hydrolysis may be reduced to an extremely low order.

However, I have found that by maintaining a pH above about 9 in the solution the formation of ammonia reaction products is in major part inhibited and that all such ammonia reaction products formed may be substantially decomposed by subjecting the solution to prolonged heating at temperatures approximating the boiling point of the solution.

The discoveries hereinabove disclosed are particularly applicable in the synthesis of carboxylic amino acids by hydrolyzing the nitrile in the presence of an amine, such as ethylene diamine, as described in the above identified application. In accordance with the method disclosed therein the nitrile solution is added slowly to an amine solution which is maintained at a temperature within the range 40–45° C., the rate of addition of the nitrile being consistent with the rate of $NH_3$ evolution from the solution.

In accordance with this method of synthesis of the carboxylic amino acid, the temperature of the amine solution is maintained substantially constant and the concentration of the nitrile in the amine solution is maintained within close limits by controlling the rate of addition of the nitrile solution with respect to the rate of nitrile hydrolysis as evidenced by the $NH_3$ evolution. Under such carefully controlled conditions a consistently high percentage conversion of the nitrile into the carboxylic acid salt and the substitution of this carboxylic acid salt for one of the amino hydrogens of the amine may be obtained, and by so hydrolyzing and substituting up to a total of four (4) moles of the nitrile in an aqueous solution containing one (1) mole of ethylene diamine, the mono-, di-, tri- and tetra- substituted carboxylic amino acids may be synthesized.

As an improvement of this process, however, I have found that by adding to the amine solution a sufficient amount of caustic alkali (NaOH) to insure a pH of above about 9 in the solution during the hydrolysis and substitution reaction, the hydrolysis reaction is rendered more rapid and more complete; solution and ionization of the $NH_3$ evolved in the hydrolysis reaction is substantially inhibited; the expulsion of the gaseous ammonia from the solution is assured; and that the excess alkali stabilizes and inhibits ionization and decomposition of the carboxylic acid group prior to and after substitution of the same in the amine. By such an alkali addition the losses incident to the formation of complex intermediate decomposition and reaction products of the nitrile, the carboxylic acid sodium salt hydrolysis product, and the desired carboxylic amino acid sodium salt reaction product, are greatly minimized and the synthesis reaction results in a relatively high yield of the sodium salt of the particular carboxylic amino acid being formed, particularly where the concentration of the amino acid salt in the solution is relatively high.

As a further improvement on the synthesis method disclosed in said co-pending application, I have discovered that by forming the nitrile, hydrolyzing the same and reacting the hydrolyzed product with an amine, such as ethylene diamine, substantially simultaneously in a solution having a pH above about 9, the reaction can be conducted at materially higher temperatures than 40–45° C. and may be completed in a relatively short time interval with consistently high recoveries approximating a 100% conversion of the amine to the carboxylic amino acid sodium salt in concentrated solutions.

As an example of this reaction, one mole weight of NaCN and one mole weight of ethylene diamine are dissolved in about 250 c.c. of water and the solution is brought to a pH of about 9 by the addition thereto of about 5 grams of NaOH. The solution is heated to a temperature approximating 60° C. and one mole of an aldehyde, such as formaldehyde, is added at a substantially constant rate while the solution is being subjected to vigorous agitation. Preferably the surface of the solution during the aldehyde addition is enclosed by a reflux condenser to reduce the losses by volatilization of the aldehyde and preferably also the gases passing through the condenser are collected in an $NH_3$ absorption tower and the ammonia content thereof determined as a check on the progress and efficiency of the reaction.

In performing the carboxylic amino acid synthesis reaction in this manner, the hydrine formed by the condensation of the aldehyde with the cyanide is substantially instantaneously hydrolyzed to the carboxylic acid salt which is substantially instantaneously reacted with the amine to be substituted therein for one of the amino hydrogens thereof.

By regulating the rate of aldehyde addition to the solution to a rate consistent with the rate of substitution of the carboxylic acid salt in the amine, limiting the concentration of the carboxylic acid salt to a relatively low percentage, the method becomes smoothly operative.

At a pH of above about 9 and at temperatures above about 50° C. up to about 80° C., the NaCN and aldehyde react to form the nitrile relatively rapidly, particularly in the presence of an excess of NaCN. This rate of reaction decreases as the relative concentration of NaCN and aldehyde approach equality, however, as the concentration of the NaCN decreases in solution the ionization increases, thus preventing the condensation reaction from slowing up inordinately as to rate of reaction.

As the pH above about 9 inhibits ionization of the hydrolysis product, the substitution reaction of this sodium salt in the amine proceeds at a rate governed by the temperature and concentration. In general, I prefer to slow down the rate of aldehyde addition after approximately 75% of the aldehyde has been added to allow for the decrease in the several rates of reaction.

These series of reactions hereinabove described may be summarized as follows:

NaCN+NH$_2$—CH$_2$—CH$_2$—NH$_2$+CH$_2$O+

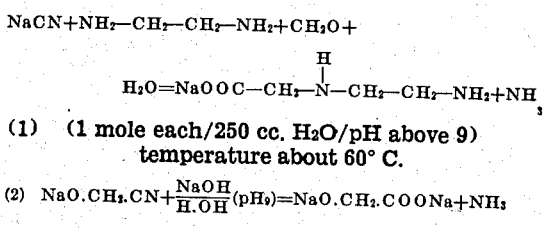

(1) (1 mole each/250 cc. H$_2$O/pH above 9) temperature about 60° C.

(2) NaO.CH$_2$.CN+$\frac{NaOH}{H.OH}$(pH$_9$)=NaO.CH$_2$.COONa+NH$_3$ (3) NaO·CH$_2$·COONa+NH$_2$·CH$_2$·CH$_2$·NH$_2$= NaOOC·CH$_2$·NH·CH$_2$·CH$_2$·NH$_2$+NaOH The resulting solution of approximately 250 c.c. contains the compound NaOOC·CH$_2$·NH·CH$_2$·CH$_2$·NH$_2$, which is the sodium salt of a mono carboxylic acid of ethylene diamine, in almost quantitative molar amounts, with only slight losses incident to the formation of decomposition and condensation of interaction products of the nitrile, the sodium salt of the carboxylic compound, NH$_3$, and of the mono carboxylic amino acid sodium salt above identified.

By adding another molecular weight of NaCN to the solution containing the sodium salt of the mono carboxylic acid of ethylene diamine and then by adding another molecular weight of formaldehyde (CH$_2$O) to the solution under exactly the same conditions as hereinabove disclosed, one molar weight of the sodium salt of the di-carboxylic acid of ethylene diamine may be formed.

In like manner, the tri and tetra substituted carboxylic amino acid salts may be produced. I have discovered, however, that whereas it is comparatively easy to form the mono and di substituted amino acids in this manner in solutions having a pH of about 9, the formation of the tri and tetra substituted amino acids requires a pH of about 11 to inhibit ionization of the carboxylic amino acid salt. This is believed in part due to the fact that with increasing substitution the normal basicity of the amine decreases thereby requiring a higher pH to suppress the increased tendency of the carboxylic acid salt group (COONa) to hydrolyze to an acid group (·COOH) and in turn to break down to an anhydride:

either by reaction with free hydroxyl ions in the solution or by condensation between the ·COOH groups adjacently attached to the same amino nitrogen according to the following reaction:

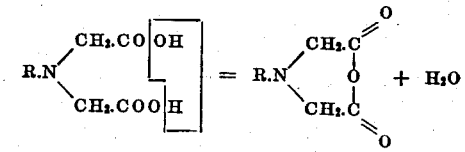

The formation of these carboxylic acid groups and carboxylic acid anhydrides by hydrolysis opens the carboxylic amino acids to interaction with organic and inorganic ions in solution therewith to form complex compounds that are exceedingly difficult to remove or to isolate from the solution. It is believed apparent that the tendency of the mono carboxylic amino acid salt to so hydrolyze would be less than the tendency of the di-carboxylic amino acid salt and that the tri and tetra substituted acids would evidence a greater tendency to so hydrolyze. By increasing the pH of the solution with respect to the extent of substitution from a pH of about 9 to a pH of about 11, the hydrolysis of these substituted carboxylic acid groups can be substantially inhibited and the synthesis reaction may be carried to a substantially quantitative conclusion.

It is believed apparent to any one skilled in the art that the reaction hereinabove disclosed and described with respect to the formation of the sodium salt of the mono to tetra carboxylic acid of ethylene diamine, is equally as applicable to the formation of any alkali metal salt of said acid by substituting such alkali metal cyanide and hydroxide compounds for the sodium cyanide and hydroxide compounds specified in the amounts and proportions indicated, and in the claims the term sodium cyanide and the term sodium hydroxide are to be construed as including, as equivalents therefor, any alkali cyanide or hydroxide.

It is believed apparent to any one skilled in the art that any aliphatic amine such as the primary to tertiary, mono and poly amines may be substituted for the ethylene diamine of the specific embodiment given without essential departure from the present invention, such substitution requiring only the application of the expected knowledge and skill of one skilled in the art in the regulation of the solution pH, temperature and concentration in the practice of the present invention so modified.

As an illustration of the equivalency of such other amines, diamino propanol having the formula:

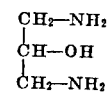

may be substituted for ethylene diamine in the specific embodiments above given and the mono to hexa substituted carboxylic amino acids may be synthesized therefrom.

Propylene diamine having the formula:

may be substituted for the ethylene diamine and the mono to hexa substituted carboxylic amino acids synthesized therefrom.

Ethylamine (C$_2$H$_3$·NH$_2$) may be converted into the mono-, di-, and tri-carboxylic amino acid.

Diethylene triamine having the structure:

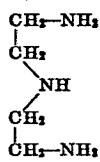

may be converted by the present invention into the mono to hexa (plus one) carboxylic amino acid, the extra carboxylic acid group displacing the amino hydrogen of the center NH group.

Similarly, tri-ethylene tetra amine having the structure:

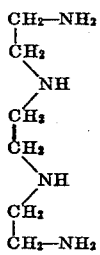

may be converted into the mono to hexa (plus two) carboxylic amino acid, the two extra carboxylic acid groups displacing the two amino hydrogens of the two center NH groups.

From the above examples, it is believed apparent that in the practice of the present invention a plurality of carboxylic amino acids of the aliphatic series of amines and poly amines may be synthesized by substituting such amines for the ethylene diamine of the specific embodiments hereinabove given and that such amines chemically are full equivalents for the ethylene diamine of the specific embodiments.

It is also believed apparent that any aldehyde may be substituted for the formaldehyde of the specific embodiment given without essential departure from the present invention, such substitution providing means for obtaining a plurality of carboxylic acid groups for substitution in the amine, thereby giving rise to carboxylic amino acids not heretofore known in the art and requiring only the application of the expected knowledge and skill of one skilled in the art in the regulation of the solution pH, temperature and concentration in the practice of the present invention so modified.

It is also believed apparent to any one skilled in the art that even in the practice of the present embodiment given, wide variations in temperature during the hydrolysis and substitution reactions may be made without essential departure from the present invention, and that the relative concentrations of the nitrile, the carboxylic hydrolysis product and the amine may be widely varied without substantial departure from the present invention. In general, the hydrolysis of the nitrile may be obtained at any temperature within the range 30–100° C. although preferably the hydrolysis is performed within the range 50–75° C. where the mole reacting weights are employed in the concentrations given in the specific embodiment. As the concentration of the mole reacting weights decreases, ionization and reaction rates increase and lower hydrolysis and substitution temperatures are preferred and vice versa. In general, as the concentration of the sodium salt of the carboxylic amino acid decreases the amount of free caustic alkali in the solution to inhibit ionization of the carboxylic acid groups present in the compound increases as one skilled in the art will recognize.

Having hereinabove described the present invention generically and specifically and given one specific embodiment thereof and identified the substantial equivalents for the reacting compounds of the specific embodiments, all modifications and adaptations of the present invention are contemplated within the scope of the following claims.

What I claim is:

1. The method of forming the alkali metal salts of a mono carboxylic amino acid which comprises forming an aqueous solution containing substantially equimolecular weights of sodium cyanide and ethylene diamine, adding sodium hydroxide thereto in an amount at least sufficient to produce a pH of about 9, heating the solution to a temperature within the range 50 to 75° C. and adding thereto for each molecular weight NaCN originally present therein one molecular weight of formaldehyde, the rate of addition of said formaldehyde being regulated in proportion to the evolution of $NH_3$ formed by the reaction and with respect to the temperature of heating and the concentration of said solution to maintain a relatively low concentration of the compound formed by the hydrolysis of the product of reaction between the said cyanide and said aldehyde in the said solution, and removing ammonia as it forms.

2. The method of forming the alkali metal salts of a mono carboxylic amino acid which comprises forming an aqueous solution containing substantially equimolecular weights of an alkali metal cyanide and ethylene diamine, adding an alkali metal hydroxide thereto in an amount at least sufficient to produce a pH of about 9, heating the solution to a temperature within the range 50 to 75° C. and adding thereto for each molecular weight of alkali metal cyanide originally present therein one molecular weight of formaldehyde, the rate of addition of said formaldehyde being regulated in proportion to the evolution of $NH_3$ formed by the reaction and with respect to the temperature of heating and the concentration of said solution to maintain a relatively low concentration of the compound formed by the hydrolysis of the product of reaction between the said cyanide and said aldehyde in the said solution, and removing ammonia as it forms.

3. The method of forming the alkali metal salts of a mono carboxylic amino acid which comprises forming an aqueous solution containing substantially equimolecular weights of an alkali metal cyanide and an aliphatic amine, adding an alkali metal hydroxide thereto in an amount at least sufficient to produce a pH of about 9, heating the solution to a temperature within the range 50 to 75° C. and adding thereto for each molecular weight of alkali metal cyanide originally present therein one molecular weight of formaldehyde, the rate of addition of said formaldehyde being regulated in proportion to the evolution of $NH_3$ formed by the reaction and with respect to the temperature of heating and the concentration of said solution to maintain a relatively low concentration of the compound formed by the hydrolysis of the product of reaction between the said cyanide and said aldehyde in the said solution, and removing ammonia as it forms.

4. The method according to claim 3 wherein said aliphatic amine is an alkylene polyamine.

FREDERICK C. BERSWORTH.

Certificate of Correction

Patent No. 2,387,735.  October 30, 1945.

FREDERICK C. BERSWORTH

It is hereby certified that errors appear in the printed specification of the above numbered patent requiring correction as follows: Page 3, first column, line 25, strike out "(1)"; lines 27 to 31 inclusive, strike out (2) $NaO.CH_2.CN + \dfrac{NaOH}{H.OH}(pH_6) = NaO.CH_2.COONa + NH_3$ (3) $NaO.CH_2.COONa + NH_2.CH_2.CH_2.NH_2 = NaOOC.CH_2.NH.CH_2.CH_2.NH_2 + NaOH$ page 3, second column, line 10, for "corboxylic" read *carboxylic*; page 4, second column, line 38, strike out the period after the numeral "9" and insert instead a comma; and that the said Letters Patent should be read with these corrections therein that the same may conform to the record of the case in the Patent Office.

Signed and sealed this 19th day of March, A. D. 1946.

[SEAL]

LESLIE FRAZER,
*First Assistant Commissioner of Patents.*